Figure 1:
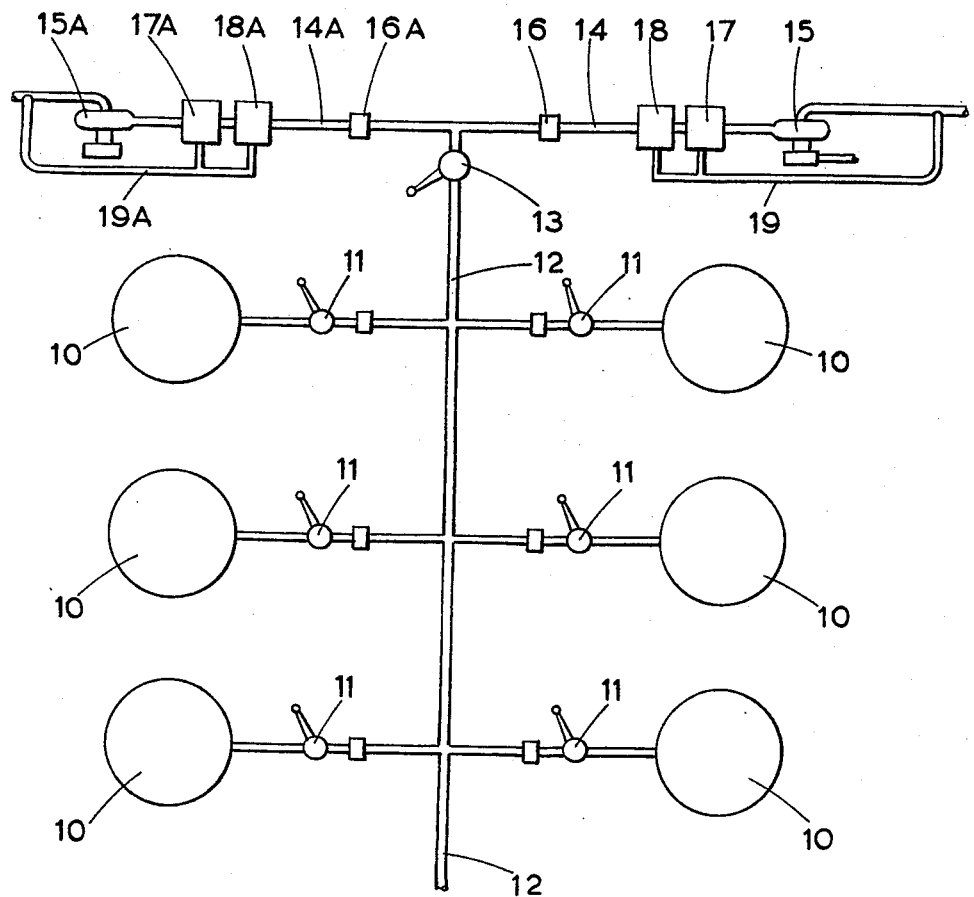

Dec. 16, 1958

H. COOK
FUEL SYSTEMS FOR GAS TURBINE
ENGINE INSTALLATIONS 2,864,440

Filed March 7, 1955

3 Sheets-Sheet 1

INVENTOR
Henry Cook
BY
Leech and Radure
ATTORNEYS.

Dec. 16, 1958

H. COOK 2,864,440

FUEL SYSTEMS FOR GAS TURBINE ENGINE INSTALLATIONS

Filed March 7, 1955

3 Sheets-Sheet 2

INVENTOR
Henry Cook
BY
Leech and Rodue
ATTORNEYS

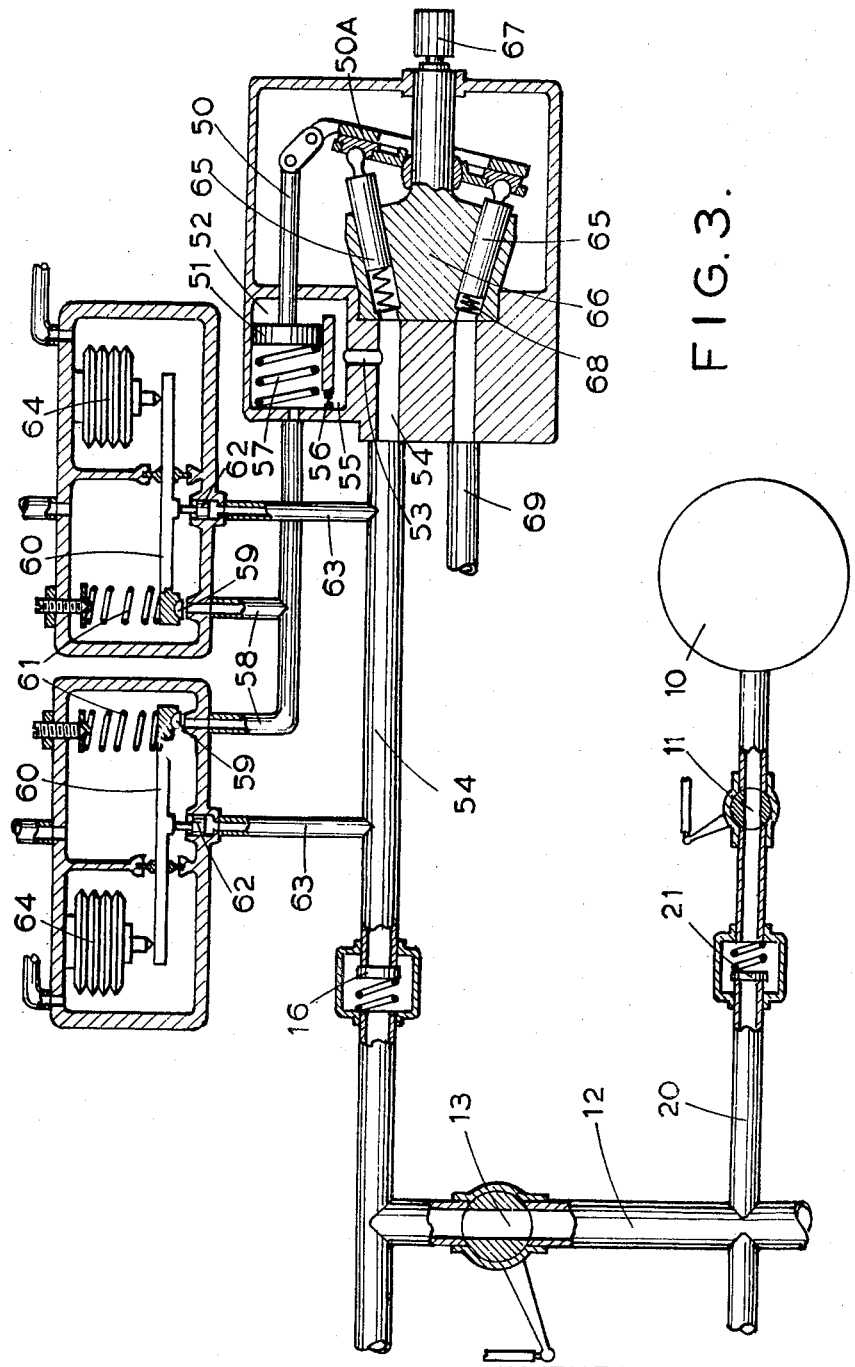

United States Patent Office 2,864,440
Patented Dec. 16, 1958

2,864,440

FUEL SYSTEMS FOR GAS TURBINE ENGINE INSTALLATIONS

Henry Cook, Derby, England, assignor to Rolls-Royce Limited, Derby, England

Application March 7, 1955, Serial No. 492,662

Claims priority, application Great Britain March 25, 1954

6 Claims. (Cl. 158—36.3)

This invention relates to fuel systems for gas-turbine engine installations. The invention is more particularly applicable to engine installations in aircraft where it is important from the point of view of safety of operation to ensure continuity of fuel delivery despite failures which may occur in the fuel system.

According to the present invention a fuel system of a gas-turbine installation comprises at least two fuel pump systems each delivering fuel to common ducting supplying one or more engines, there being provided non-return or equivalent valve devices for preventing return flow from said common ducting into delivery ducting leading from each of said pump systems, the fuel system being further characterised by means regulating the pressures in said delivery ducting, said means comprising at least two pressure-controlling devices associated with each pump system, each adapted to limit the permissible pressure in the associated delivery ducting to a preselected value and so arranged that any one of them will continue so to limit said pressure notwithstanding the failure of the other or others.

Preferably the pressure in each delivery ducting is pre-selected so that during normal operation of the fuel system fuel is delivered by each fuel pump system to the common ducting.

In certain preferred embodiments of the invention the pressure-controlling devices comprise relief valves arranged to bleed off fuel from the delivery ducting, such fuel being returned directly or indirectly to the suction side of an associated fuel pump system. In certain cases the excess fuel may be returned to a storage tank; alternatively the excess fuel may be delivered directly to the inlet side of a fuel pump system.

In other arrangements according to the invention fuel pumps of the variable volumetric capacity kind may be used, and pressure-controlling devices are provided to regulate the capacity of the pump or pumps to maintain the pre-selected pressure in the delivery ducting.

The fuel pump systems may be driven by compressed air derived from one or more engines of the installation, and each system may comprise one or more pumps.

A fuel system according to the present invention presents the characteristic that in the event of failure of a fuel pump system a reverse flow through the delivery line of said pump system is prevented by closure of the associated non-return valve whereby the remaining pump system or systems continue to deliver to the common supply conduit. Further, one of the pressure-controlling devices regulating the pressure in the delivery pipeline from a pump may suffer from a defect so that it regulates the pressure to be in excess of the pre-selected value, or alternatively so that it regulates the pressure to be less than the pre-selected value. By providing two pressure-controlling devices for each pump system, the failure of one so that it tends to regulate the pressure to an excessive value is overridden by the second to maintain the pre-selected pressure in the delivery pipeline. In the event of the combination of the two devices regulating the pressure in the delivery line at a lower value than that pre-selected, the non-return valve in the associated delivery line will close.

The invention has particular application where a plurality of gas-turbine engines are supplied by a common fuel conduit, and it is desired to control such engines in unison. In such a case it may be desirable to reduce the weight of the installation, and the provision of fuel control devices associated with each engine is preferably avoided. Thus, it is preferred to avoid the use of speed governor devices, which are often used in gas-turbine engines to avoid the possibility of overspeeding of the engine in the event of a failure in the fuel supply and control system.

One particular application of the invention is to aircraft engine installations in which a plurality of gas-turbine reaction-propulsion engines have their propulsive jets directed downwards to provide vertical lift on the aircraft. Aircraft having such gas-turbine engine installations are commonly referred to as "jet lift aircraft." It will be appreciated that in particular in such aircraft it is highly desirable to reduce the weight of the installation, whilst at the same time it is of the utmost importance to ensure a high degree of reliability of the fuel supply and control system, since during take-off and landing the aircraft relies solely on the engines to provide the lift maintaining the aircraft airborne.

Preferably the maximum pressure in the delivery ducting from the fuel pump system is varied in direct proportion to the ambient air pressure. By varying the pressure in the fuel ducting in this way and by so selecting the fuel injectors in combination with resiliently-loaded flow control valves in the delivery pipeline to the engine or engines in known manner, the engine or engines may be maintained at a substantially constant preselected rotational speed notwithstanding changes of altitude. In certain cases the fuel injectors themselves may provide the required characteristic without the use of the resiliently-loaded flow control valves mentioned.

According to a feature of the invention a fuel system particularly suitable for use in jet lift aircraft has at least two relief valves associated with each fuel pump system, each of said relief valves being arranged to control the pressure in the delivery pipeline from the pump to be a function of ambient air pressure.

According to a feature of the invention a fuel system arranged to supply a plurality of engines from a common fuel supply conduit includes a single main control whereby the engines are controlled in unison, and additionally each engine is provided with a fuel shut-off device, which permits starting and stopping of each engine independently of the main single control.

Figure 2:
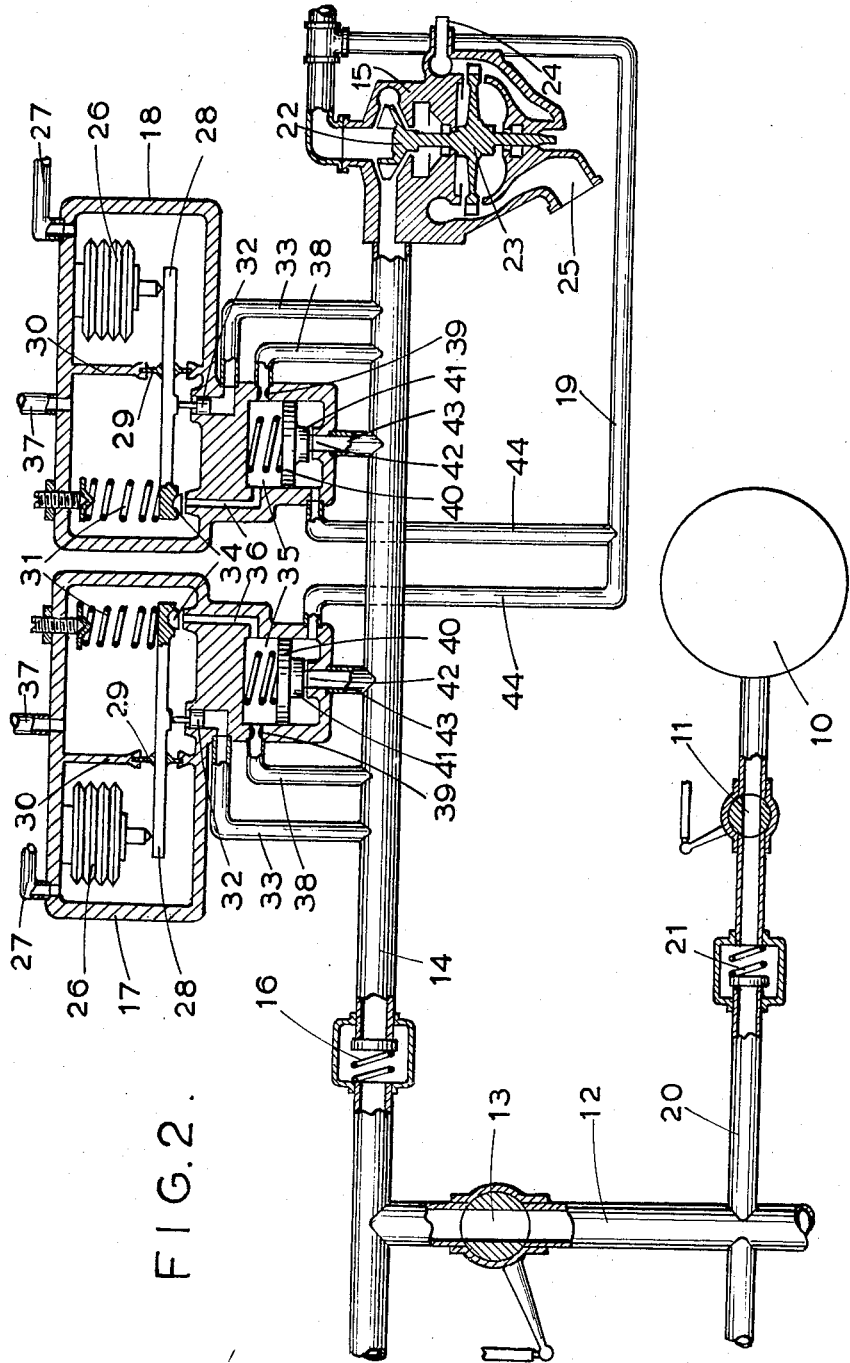

A preferred embodiment of the invention is illustrated diagrammatically in the accompanying drawings, in which:

Figure 1 shows schematically a fuel system arranged to supply a plurality of engines, Figure 2 illustrates in greater detail part of one half of the system shown in Figure 1, and Figure 3 illustrates a modification.

Referring to Figure 1 a plurality of gas-turbine engines of jet reaction type are shown at 10. Such engines normally comprise a compressor system delivering compressed air to combustion equipment in which liquid fuel is burnt, such fuel being introduced into the combustion space by atomising fuel injectors; the products of combustion pass through a turbine driving the compressor system, and the gases exhausting from the turbine pass to atmosphere, providing a thrust. As previously mentioned, the thrust may be used for providing a lift force on an aircraft, the exhaust jets being directed vertically downwards.

Each engine has a separate throttle 11, which may additionally function as a shut-off cock, the purpose of the throttles 11 being to permit independent starting and shut down of each engine.

The fuel supply to the engines is effected from a common supply conduit 12, from which lead branch feedlines each including its separate throttle 11. The common supply conduit 12 also includes a single main control valve 13 by which the pilot can control all the engines in unison. The control valve may also function as a shut-off cock; alternatively, a separate shut-off cock may be provided. The common supply conduit 12 is connected to fuel delivery pipe lines 14 and 14A through which fuel is delivered by pumps 15 and 15A. Such pumps may be of the positive-displacement or centrifugal kind and are preferably driven by air turbines, which are supplied with compressed air tapped from the engines. Preferably each air turbine has an independent air supply system, whereby failure of ducting associated with one pump does not affect the operation of the other. Each delivery pipe line includes a non-return valve 16 and 16A, arranged to prevent reverse flow in the associated pipe line. In addition, relief valves 17, 18, 17A and 18A are provided which bypass excess fuel delivered by the pumps and control the delivery pressure in the pipe lines 14 and 14A. The by-passed fuel may be returned by pipe lines 19 and 19A to the aircraft tanks or alternatively to the inlet side of the pumps 15 and 15A.

In normal operation of the fuel system described above both pumps are in operation and excess fuel delivered is by-passed through the relief valves, which are set to control the pressures in the delivery pipe lines 14 and 14A to be substantially equal. Each fuel pump is, however, designed to be of sufficient capacity to meet the full fuel requirements of the engine installation in the event of the failure of one pump or of the relief valve system associated therewith.

Figure 2 shows in greater detail part of the right-hand side of the fuel system illustrated in Figure 1. Thus an engine is indicated at 10 with its separate throttle at 11 in branch feed line 20. The feed line 20 also includes a spring-loaded valve 21 which in combination with fuel injectors in the engine produces a pressure flow characteristic such that the fuel flow is substantially proportional to the fuel pressure.

For example, if the fuel injectors are of the fixed-area type, the pressure difference across them will be proportional to the square of the flow through them, and the spring-loaded valve 21 will be so shaped, and the rate of its spring so chosen, that $PD = KF - CF^2$, where PD is the pressure difference across the valve, F is the fuel flow, and K and C are constants.

Alternatively, the valve 21 may be omitted, and the fuel injectors may be of the spring-loaded variable-area orifice type, and may be arranged to have a characteristic such that the fuel flow is substantially proportional to the fuel pressure.

The common supply conduit is shown at 12 including the main control valve 13. The fuel delivery pipeline 14 includes the non-return valve 16 and fuel is delivered to the pipeline 14 by means of a centrifugal pump 15 comprising an impeller 22 driven by an air turbine 23. Compressed air tapped from the engines is supplied to the air turbine through inlet connection 24 and exhausted to atmosphere through duct 25.

The relief valve devices regulating the pressure in the delivery pipeline 14 are indicated generally at 17 and 18. These valves are of similar construction, and each is arranged to regulate the fuel pressure to a pre-selected value substantially proportional to atmospheric pressure. Each valve thus comprises an evacuated capsule 26 accommodated in a chamber having free communication through pipe 27 with the atmosphere. The capsule 26 loads a lever 28 which is hinged by means of a diaphragm 29 in a supporting wall structure 30. The lever 28 is additionally loaded by means of a spring 31 and a piston 32. The underside of the piston 32 is connected by the pressure pipeline 33 to the delivery pipeline 14 whereby a load is imposed on the lever proportional to the fuel delivery pressure. This load acts in the same sense as the load imposed by the capsule 26 and is balanced against the load imposed by the spring 31. The lever 31 has a half-ball valve 34 which serves to control the leakage of servo-pressure fuel from one end of a cylinder 35 through passageway 36. The leakage flow passes from the chamber accommodating the spring through connection 37 to a drain connection back to the aircraft tank or to any other suitable location. Fuel from the pump is supplied to this end of the cylinder 35 through connection 38 leading from the delivery pipeline 14, and the connection includes a restrictor 39. It will thus be appreciated that the pressure within this end of the cylinder 35 is controlled by the movement of the half-ball valve 34 in the sense of opening and closing. A piston relief valve element 40 operates in the cylinder 35, having a portion 41 cooperating with a seating 42 on a relief flow connection 43 leading from the delivery pipeline 14. Fuel by-passed through this relief flow connection passes into by-pass connection 44 which connects with pipeline 19 leading to the aircraft tank or alternatively to the inlet side of the pump at 15. It will be appreciated that the by-pass flow is controlled in accordance with the pressure within the end of the cylinder 35, which loads the relief valve piston and which is controlled by the half-ball valve 34.

The operation of the relief valve described above is such as to maintain the fuel delivery pressure in pipeline 14 substantially proportional to atmospheric pressure. Thus if the pressure in delivery pipe line 14 tends to exceed a pre-selected value determined in accordance with the load exerted by the spring 31 and by the load exerted by the capsule 26, the lever moves in the sense of lifting the half-ball valve thereby reducing the pressure within the cylinder 35. Alternatively if the pressure in the delivery pipeline 14 is below the pre-selected value the half-ball valve 34 is closed thereby increasing the load acting on the piston 40 in the cylinder 35.

Thus the fuel flow to the engine may be arranged to be directly proportional to the atmospheric pressure, as sensed by pipe 27, or if desired to the engine intake pressure; furthermore by suitable choice of the characteristics of valve 21 and the fuel injectors, other desired characteristics may be obtained.

Considering the action of the fuel system illustrated in the figures, it will be appreciated that (a) If one of the pumps 15 or 15A fails in the sense of decreasing the fuel flow, the associated non-return valve 16 will close, and fuel will continue to be supplied by the other pump and, within certain limiting conditions, the fuel pressure will be maintained due to the relief valves 17A, 18A or 17, 18 associated with the operating pump 15A or 15 being closed somewhat more than they would have been prior to the failure.

(b) If one of the pumps 15 or 15A fails in the sense of delivering an excess of fuel, the excess quantity will be by-passed through the relief valves 17, 18 or 17A, 18A.

(c) If one of the control units, say control unit 17, fails in the sense of increasing the fuel flow, the lever 28 and relief valve 41 of the other control unit 18 associated with the same pump 15 will be adjusted in the appropriate sense to compensate.

(d) If one of the control units, say control unit 17, fails in the sense of decreasing the fuel flow, then if the decrease is relatively small the relief valve 41 of the other control unit 18 associated with the same pump 15 will be adjusted in the appropriate sense to compensate, but if the decrease is too large to be compensated in this manner, the associated non-return valve 16 will close, and the situation will be as in paragraph (a) above.

(e) If both the control units, say 17, 18, associated with one pump 15 fail in the sense of closing the relief valves 41 the delivery from that pump 15 to the common supply conduit will be excessive, but the control units 17A, 18A associated with the delivery from the other pump 15A will tend to cut down fuel supply from that pump.

(f) If on the other hand the control units, say 17, 18, associated with one pump 15 fail with the relief valves 41 fully open, the associated non-return valve 16 from that pump will close and the situation will be as in paragraph (a) on a pump failure.

Whilst in the embodiment described above the fuel pressure in the delivery pipelines 14, 14A is regulated by by-passing excess fuel delivery through relief valves, alternative arrangements may be adopted in which the pressure is maintained by means regulating the delivery of variable-capacity pumps. The pumps may be of the swashplate type, and each pump may have as shown in Figure 3 a member 50 connected to the swashplate 50A to adjust it and connected at its other end to a piston 51 acting in a cylinder 52. One end of the cylinder may be connected directly through conduit 53 to the delivery pipeline 54 of the respective pump, and the other end of the cylinder will be connected to the delivery pipeline 54 through a conduit 55 containing a restrictor 56. The latter end of the cylinder also contains a spring 57 loading the piston and has connected to it a pair of vent pipes 58 the outlet from each of which is controlled by a half-ball valve 59. Each half-ball valve 59 is carried on a pivoted lever 60, and is loaded in the sense of closing by a spring 61 and in the sense of opening by a piston 62 connected through a conduit 63 to the delivery pipeline 54 so that the piston is subjected to the pump delivery pressure, and the lever is also loaded in the sense of opening the half-ball valve by a capsule 64 which is subjected externally to atmospheric pressure.

It will be arranged that closure of the half-ball valve 59 causes movement of the piston 51 in the cylinder 52 in the sense of increasing the stroke of the pump and thus increasing the fuel delivery, and movement in the sense of opening the half-ball valve results in a reduction of the fuel delivery.

The reduction or increase of fuel delivery is effected by movement of the link member 50 and swashplate 50A to vary the stroke of the pump plungers 65 carried in the valve body 66 driven rotationally through a shaft 67; pump plungers 65 operating against the reaction of springs 68 to draw fuel from the fuel supply pipe 69 and deliver it into the pipe 54.

The control units comprising the parts 59—64 may be identical with part of the relief valve units 17, 18, 17A, 18A.

The arrangement of Figure 3 may be designed to cater for the conditions discussed at (a), (c), (d), (e), and (f) in the manner described above, bearing in mind that instead of the adjustment of relief valves 41 there will be a corresponding adjustment of the pressure in cylinder 52 and thus of the pump swashplate.

I claim:

1. A fuel system for an engine installation including at least two gas turbine engines, comprising in combination at least two fuel pump systems, each system including at least one pump, a delivery pipe line connected to each fuel pump to receive fuel therefrom, common ducting connected to the said delivery pipe lines and adapted to connect to said engines to supply fuel thereto, non-return valve means in each of said delivery pipe lines to prevent return flow thereinto from said common ducting and from another of said delivery pipe lines, and means to regulate the pressure in each of said delivery pipe lines comprising at least two simultaneously and complementally-operable pressure-controlling devices connected to each delivery pipe line, means in each device sensitive to the pressure in the corresponding delivery pipe line and to an opposing predetermined load and operable to control the flow in the pipe line to limit the pressure therein to a preselected value, the capacity of each pump being selected to be sufficient to meet the maximum demand should at least one other pump fail, and the capacity and range of adjustment of each flow controlling means being sufficient for it to maintain the preselected pressure in the corresponding delivery pipe line on failure of any number of the other controlling means associated with the last named pipe.

2. A fuel system as claimed in claim 1 wherein said predetermined load is varied by means sensitive to atmospheric pressure whereby said preselected value of fuel pressure in said delivery line is varied in accordance with atmospheric pressure and the rotational speed of the engine installation is maintained substantially constant with varying atmospheric pressure.

3. A fuel system as claimed in claim 2 wherein the pressure-controlling devices comprise relief valves connected to the delivery pipeline to bleed off fuel therefrom.

4. A fuel system as claimed in claim 3 comprising also conduit means from the discharge side of said relief valves to the suction side of a fuel pump to return the bled-off fuel directly from said relief valves to said fuel pump.

5. A fuel system as claimed in claim 4, wherein each pressure-controlling device comprises a cylinder and a piston element in said cylinder, said piston element having a valve portion, and there is provided a seating in communication with the delivery pipeline and adapted to co-operate with said valve portion, and there is also provided conduit means from said delivery pipeline to the cylinder on the side of the piston remote from said seating, said conduit means containing a restrictor, second conduit means communicating with said cylinder on said side of the piston, said second conduit means having an outlet, valve means co-operating with said outlet, resilient means acting on said valve means to close it, and pressure-responsive means subject to the pressure in the delivery pipeline and acting on said valve means to open it.

6. A fuel system as claimed in claim 1, wherein a fuel pump system comprises a fuel pump of the variable-capacity positive-displacement type, and wherein the pressure-controlling device comprises means operative to limit the pressure in the delivery pipeline by varying the pump capacity.

References Cited in the file of this patent

UNITED STATES PATENTS

| | | |
|---|---|---|
| 2,517,313 | Hooker et al. | Aug. 1, 1950 |
| 2,590,853 | Fulton | Apr. 1, 1952 |
| 2,617,361 | Neal | Nov. 11, 1952 |
| 2,664,152 | Davies et al. | Dec. 29, 1953 |
| 2,678,004 | Harris | May 11, 1954 |